(12) United States Patent
Liu (10) Patent No.: US 11,094,291 B2
(45) Date of Patent: Aug. 17, 2021

(54) METHOD AND DEVICE FOR DETECTING AMBIENT LIGHT AND TERMINAL

(71) Applicant: BEIJING XIAOMI MOBILE SOFTWARE CO., LTD., Beijing (CN)

(72) Inventor: Gaosen Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/787,996

(22) Filed: Feb. 11, 2020

(65) Prior Publication Data

US 2021/0125578 A1    Apr. 29, 2021

(30) Foreign Application Priority Data

Oct. 29, 2019    (CN) .......................... 201911040417.X (51) Int. Cl.
*G02F 1/1335* (2006.01)
*G09G 5/10* (2006.01)
*H04B 1/3827* (2015.01)

(52) U.S. Cl.
CPC .............. *G09G 5/10* (2013.01); *H04B 1/3827* (2013.01); *G09G 2320/0626* (2013.01); *G09G 2360/144* (2013.01); *G09G 2360/145* (2013.01)

(58) Field of Classification Search
CPC combination set(s) only.
See application file for complete search history.

(56) References Cited

U.S. PATENT DOCUMENTS

| 8,933,916 | B1 | 1/2015 | Doar et al. |
| 9,961,744 | B1 | 5/2018 | Doar et al. |
| 2009/0152445 | A1* | 6/2009 | Gardner, Jr. .......... H05B 47/165 250/214 AL |
| 2011/0204793 | A1 | 8/2011 | Gardner, Jr. |
| 2012/0320004 | A1* | 12/2012 | Kitakado .............. G09G 3/3648 345/204 |
| 2013/0161489 | A1 | 6/2013 | Gardner, Jr. |
| 2017/0110051 | A1 | 4/2017 | Gardner, Jr. |
| 2020/0152122 | A1 | 5/2020 | Doar et al. |

FOREIGN PATENT DOCUMENTS

| CN | 108924316 A | 11/2018 |
| EP | 3447756 A1 | 2/2019 |

OTHER PUBLICATIONS

Extended European Search Report in the European Application No. 20159496.7, dated Jul. 21, 2020, (10p).

* cited by examiner

*Primary Examiner* — Deeprose Subedi
(74) *Attorney, Agent, or Firm* — Arch & Lake LLP (57) ABSTRACT

A method and device for detecting ambient light on a terminal are provided. The method includes: switching, by a terminal comprising a display screen and light sensor arranged under the display screen, when detection of ambient light is requested, a display frame rate of the display screen from a first frame rate to a second frame rate, the first frame rate being greater than the second frame rate, detecting, by the light sensor, during a time interval where the second frame rate is applied, the ambient light that passes through a space gap between display units of the display screen to the light sensor, and obtaining, by the terminal, ambient brightness information based on the ambient light detected.

18 Claims, 6 Drawing Sheets

FIG. 14 understand# METHOD AND DEVICE FOR DETECTING AMBIENT LIGHT AND TERMINAL

CROSS-REFERENCE TO RELATED APPLICATION

The present application is filed based upon and claims priority to Chinese Patent Application No. 201911040417.X, filed on Oct. 29, 2019, the contents of which are hereby incorporated by reference in its entirety.

TECHNICAL FIELD

The disclosure relates to the field of electronic technology, and particularly to a method and device for detecting ambient light and a terminal.

BACKGROUND

With the rapid development in electronic technology, terminal devices such as full-screen smartphones and tablets have become increasingly popular. A light sensor is generally arranged under a screen of a terminal device.

The light sensor detects and obtains external ambient brightness information via a light-receiving area, which is a light-transmitting area that surrounds the light sensor so that the terminal can control the brightness of the display screen according to the external brightness information. However, when the terminal detects ambient light via the light-receiving area and obtains the external ambient brightness information, detection of the ambient light is easily affected by the display brightness of the display screen, and the brightness of different images displayed on the display screen also affects the accuracy in the detection of the ambient light.

SUMMARY

The disclosure provides a method and a device for detecting ambient light on a terminal.

In the first aspect of the disclosure, a method for detecting ambient light is provided. The method includes: switching, by a terminal comprising a display screen and light sensor arranged under the display screen, when detection of ambient light is requested, a display frame rate of the display screen from a first frame rate to a second frame rate, the first frame rate being greater than the second frame rate, detecting, by the light sensor, during a time interval where the second frame rate is applied, the ambient light that passes through a space gap between display units of the display screen to the light sensor, and obtaining, by the terminal, ambient brightness information based on the ambient light detected.

In the second aspect of the disclosure, a device for detecting ambient light on a terminal is provided. The device includes: a display screen, a light sensor, wherein the light sensor is arranged under the display screen within the terminal, one or more processors, and a non-transitory computer-readable storage medium configured to store an instruction executable for the one or more processors, wherein the display screen has multiple display units. Wherein the one or more processors are configured to: switch when detection of ambient light is requested, a display frame rate of a display screen from a first frame rate to a second frame rate, the first frame rate being greater than the second frame rate, detect, during a time interval where the second frame rate is applied, the ambient light that passes through a space gap between display units of the display screen to the light sensor, and obtain ambient brightness information based on the ambient light detected.

In the third aspect of the disclosure, a non-transitory computer-readable storage medium, an instruction in the storage medium being executed by one or more processors of a terminal to enable the terminal to implement a method for detecting ambient light is provided. The method includes: switching, when detection of ambient light is requested, a display frame rate of a display screen from a first frame rate to a second frame rate, the first frame rate being greater than the second frame rate, wherein the terminal comprises the display screen and a light sensor arranged under the display screen, detecting, during a time interval when the second frame rate is applied, the ambient light that passes through a space gap between display units of the display screen to the light sensor, and obtaining ambient brightness information based on the ambient light detected.

It is to be understood that the above general description and detailed descriptions below are merely examples and explanatory and not intended to limit the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to embodiments, embodiments of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Figure 1:
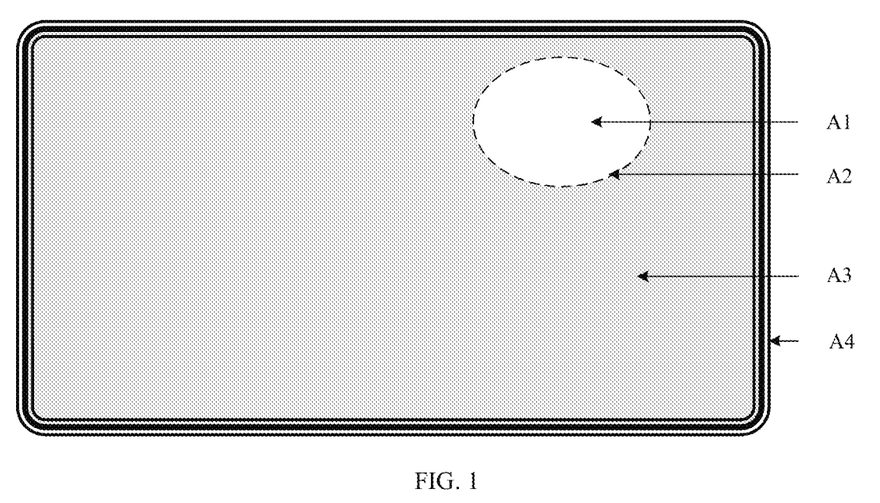
FIG. 1 is a schematic diagram illustrating a location of a light sensor, according to an example of the present disclosure.

FIG. 1 is a schematic diagram illustrating a possible location of a light sensor in a terminal. As illustrated in the FIG. 1, a screen display area A3 is formed within a range of the screen frame A4 of the terminal, a light sensor A1 is arranged below the screen in the screen display area A3, and the light sensor A1 is surrounded by a light-transmitting area A2 which is a light-receiving area of the light sensor.

Figure 2:
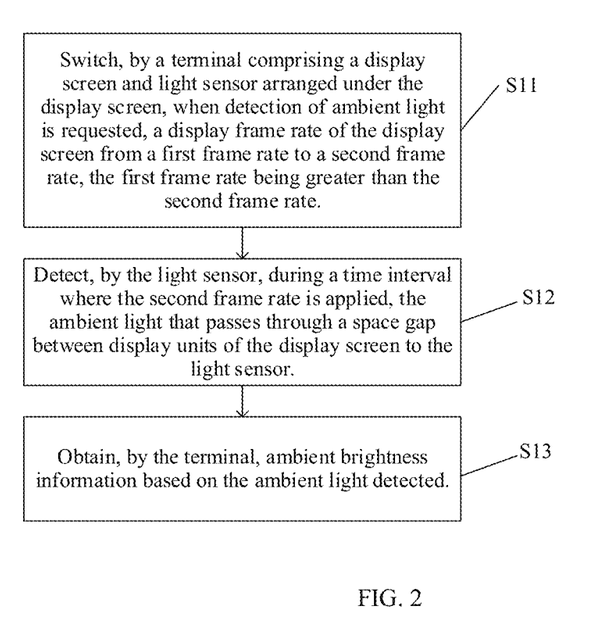
FIG. 2 is a first flowchart illustrating a method for detecting ambient light, according to an example of the present disclosure.

FIG. 2 is a first flowchart illustrating a method for detecting ambient light according to an embodiment of the disclosure. As illustrated in the FIG. 2, the method is applied to a terminal including a display screen and a light sensor which is arranged under the display screen. The method for detecting the ambient light includes the following operations.

In S11, switching, by a terminal comprising a display screen and light sensor arranged under the display screen, when detection of ambient light is requested, a display frame rate of the display screen from a first frame rate to a second frame rate, the first frame rate being greater than the second frame rate.

In S12, detecting, by the light sensor, during a time interval where the second frame rate is applied, the ambient light that passes through a space gap between display units of the display screen to the light sensor. Display units, for example, can be a pixel, a group of pixels, or sub-pixels that make up a primary color such as red, green, and blue. The display units can be part of a liquid crystal display (LCD), organic light-emitting diode (OLED) or any other type of screen display that has display units.

In S13, obtaining, by the terminal, ambient brightness information based on the ambient light detected.

In the embodiment of the disclosure, the terminal device includes a mobile device and a fixed device. The mobile device includes a cell phone, tablet computer or wearable device and so on. The fixed device includes, but is not limited to, a personal computer (PC).

The terminal device includes a display screen capable of displaying image frames. The terminal is also equipped with a light sensor that is arranged below the display screen. The light sensor can transform a light signal which transmits through the display screen into an electric signal so that the terminal can obtain corresponding brightness information according to the electric signal.

It is to be noted that with regard to the terminal with a full screen, the detection of the ambient light is achieved by detecting the light transmitted through a space gap between display units via the light sensor arranged under the display screen. The display units are arranged under or behind the display screen, for example, arranged on the side of the display screen that is not directed at the user. The light-receiving area illustrated in FIG. 1 is formed by the space gap between the display units.

According to the embodiment of the disclosure, in step S11, when the terminal needs to collect the ambient light, the display frame rate of the display screen is switched from the first frame rate to the second frame rate, i.e., increasing a time interval between displays of the adjacent frame images.

For example, the first frame rate is 60 frames/second and the second frame rate is 40 frames/second. When the image frames are displayed at the first frame rate, the time interval between the displays of the adjacent image frames is 5 ms, but when the image frames are displayed at the second frame rate, the time interval between the displays of the adjacent image frames is 8 ms. It to be noted that, the above values are merely examples and not limited to the embodiment of the disclosure.

When image frames are displayed at a certain frame rate, the time interval between displays of the image frames generally indicates a time interval for switching the image frames. Although an image frame is not displayed on the display screen during the time interval between displays of the image frames, the screen of the display screen is still affected by the displayed image frames and image frames to be displayed. The reason is that after a frame image is displayed, a value of the electric signal acting on the display unit is not decreased to 0 immediately but subject to a gradually decreasing process, so that the display brightness of the display screen also decreases gradually. When a next frame image needs to be displayed, the value of the electric signal acting on the display unit will not be adjusted to a required value immediately but subject to a gradually increasing process. As a result, within the time interval between the displays of the image frames, the display brightness of the display screen is still affected by the image frames and presents a trend of oscillation. For example, in the display interval between two adjacent frame images, the display brightness of the display screen is in a form of a parabola with an upward opening. In the embodiments of the disclosure, both a display brightness of the display screen which gradually decreases to a minimum brightness after a display of a frame image is completed and a display brightness of the display screen which gradually increases from the minimum brightness before a next frame image is displayed completely are called a remaining brightness. The remaining brightness of the display screen is less than the total display brightness of the display screen when a frame image is being displayed.

Figure 3:
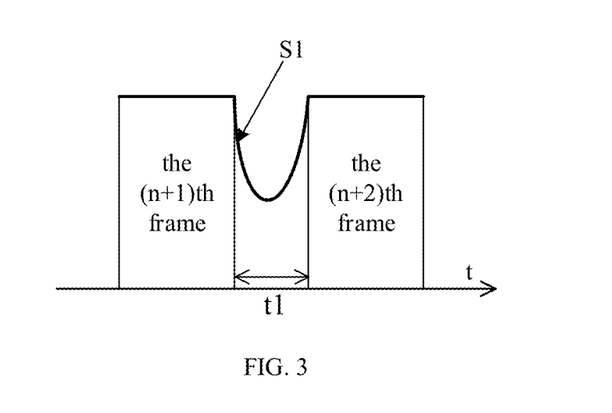
FIG. 3 is a diagram illustrating a luminous brightness curve of a display screen within a time interval for display, according to an example of the present disclosure.

FIG. 3 is a diagram illustrating a luminous brightness curve of a display screen within a time interval for display according to an embodiment of the disclosure. As illustrated in FIG. 3, S1 is the luminous brightness curve of the display screen and t1 is a time interval at a first frame rate. After display of the (n+1)th frame image is completed, a screen brightness value of the display screen gradually decreases with a decrease in the value of the electric signal; and when the (n+2)th frame image is displayed, the screen brightness value of the display screen gradually increases with an increase in the value of the electric signal. The luminous brightness of the screen in the time interval t1 is a remaining brightness at the first frame rate. The (n+1)th frame is an image displayed at a first frame rate. The time between the (n+1)th frame and (n+2)th frame is when an image is displayed at a second frame rate. The (n+2)th frame is an image displayed at the second frame rate.

Figure 4:
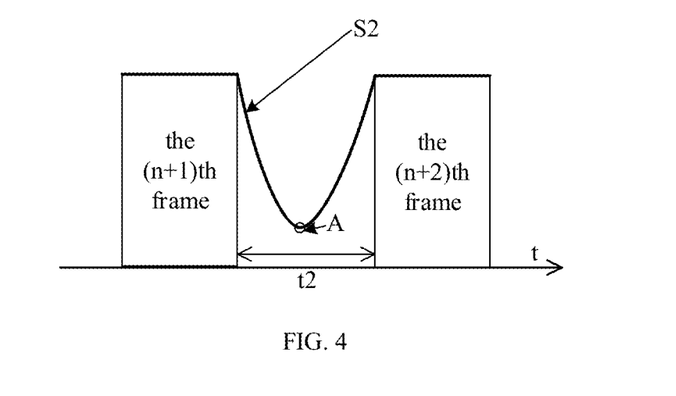
FIG. 4 is a diagram illustrating a luminous brightness curve of a display screen within a time interval for display, according to an example of the present disclosure.

In the embodiment of the embodiment, decreasing the frame rate for display prolongs the process in which the electric signal acting on display units gradually decreases and gradually increases, such that the bottom of the luminous brightness curve of the display screen will be lower relatively. FIG. 4 is a second diagram illustrating a luminous brightness curve of a display screen within a time interval for display according to an embodiment of the disclosure. As illustrated in the FIG. 4, S2 is the displayed luminous brightness curve, t2 is a time interval at a second frame rate, and the bottom of the luminous brightness curve of the display screen is lower than the bottom of the luminous brightness curve illustrated in the FIG. 3. A luminous brightness of the screen in the time interval t2 is a remaining brightness at the second frame rate.

It is to be understood that in S12, the terminal detects ambient light via a light sensor in the time interval between displays of the display screen due to the reason that in the time interval between the displays, no image frames are displayed on the display screen, so that the ambient light is relatively less affected by the display brightness of the display screen when the ambient light travels through the display screen. In the disclosure, when collection of ambient light is required, the detection of the ambient light is performed in the time interval corresponding to the decreased second frame rate, so that the impact of the display brightness of the display screen is further reduced when the light sensor detects the ambient light. Therefore, the detection accuracy can be further improved, thereby improving the accuracy of obtaining the ambient brightness information in S13.

It is to be noted that based on the abovementioned working principle of the light sensor, the brightness information obtained by the terminal according to the electric signal includes the ambient brightness information and the remaining brightness information of the display screen. The remaining brightness information is obtained in advance according a test in an experimental environment, which is an environment that is not disturbed by external ambient light.

The remaining brightness information obtained based on the test in the experimental environment may be a value of a remaining brightness corresponding to a middle moment in the time interval. As illustrated in the FIG. 4, the middle moment is a moment corresponding to an identifier A and at the moment, the value of the remaining brightness of the display screen may be a minimum value in the time interval.

In addition, it is to be noted that in the embodiment of the disclosure, the time when the terminal needs to collect the ambient light may be set according to a preset period, for example, the terminal is set to collect the ambient light every 2 seconds. The collection of the ambient light may also be triggered when a change in the environment is detected, for example, the terminal determines that there are obstacles in a preset range. The disclosure is not intended to limit the time for collecting the ambient light.

In an embodiment of the disclosure, after detecting the ambient light in a space gap between display units of the display screen through the light sensor, the terminal restores a display frame rate of the display screen from the second frame rate to the first frame rate.

It is to be understood that decreasing the display frame rate of the display screen may affect a display effect of the terminal. Therefore, in the embodiment of the disclosure, the display frame rate of the display screen is restored from the second frame rate to the first frame rate after the ambient light is detected, such that usage of the terminal does not be affected.

In an embodiment of the disclosure, the terminal determines whether the display brightness of the display screen is less than a preset brightness threshold. The step S12 includes the following.

When the display brightness of the display screen is less than the preset brightness threshold, during the time interval for display of the display screen at the second frame rate, the ambient light is detected in the space gap between the display units of the display screen through the light sensor and the ambient brightness information is obtained.

In the embodiment of the disclosure, the preset brightness threshold may be determined by technicians in advance. It is to be understood that the lower the display brightness of the display screen, the less the impact of the display brightness of the display screen on detection of the ambient light. Therefore, through detecting the ambient light within the time interval between displays of the display screen at the second frame rate when the display brightness of the display screen is less than the preset brightness threshold, the impact of the display brightness of the display screen on the detection of the ambient light by the light sensor is further reduced. In an embodiment of the disclosure, if the display brightness of the display screen within the time interval is greater than the preset brightness threshold, the terminal decreases the second frame rate.

In an embodiment of the disclosure, if there is no moment at which the display brightness of the display screen is less than the preset brightness threshold when the display frame rate of the display screen is the second frame rate, the second frame rate may further be decreased to prolong the process of gradually decreasing and gradually increasing in the electric signal acting on the display units as a whole, so as to reduce the impact of the display brightness of the display screen on the ambient light detection.

In addition, in the embodiments of the disclosure, the process of gradually decreasing and gradually increasing in the electric signal acting on the display unit is prolonged according to the decrease of the frame rate. Therefore, for different display images, such as a black image and a white image, specifically, when the black image is displayed at the (n+1)th and (n+2)th frames, and the white image is displayed at both the (n+1)th and (n+2)th frames, the display brightness of the display screen may be decreased to a relatively consistent value. That is, for different displayed images, the value of the identifier A in the FIG. 4 can maintain relative consistency. Therefore, for different frame images, the brightness value detected by the light sensor can maintain relatively consistent, so that the consistency in obtaining the ambient brightness information by the terminal can be ensured.

In an embodiment of the disclosure, due to the fact that during usage of the terminal, the environment where the terminal is located affects the ambient light greatly, for example, when a user's hand shields the display screen, the ambient light detected by the light sensor is affected by such shielding. As a result in the embodiments of the disclosure, the terminal may detect whether there are obstacles in the preset range to improve the accuracy in the ambient light detection. When the terminal detects that there are no obstacles in the preset range, the display frame rate of the display screen is switched from the first frame rate to the second frame rate.

In the embodiment of the disclosure, for example, the terminal detects whether there is an obstacle in the preset range by using a proximity sensor or a distance sensor.

In an embodiment of the disclosure, when a display brightness of the display screen is adjusted from a first display brightness to a second display brightness within the time interval during which the ambient light is detected, a display brightness difference is determined; and when the display brightness difference is greater than zero, the ambient brightness information is corrected based on the display brightness difference.

In the embodiment of the disclosure, as mentioned above, the ambient light is the result of interaction of both the remaining brightness and the ambient brightness information. In the disclosure, when a value A of the remaining brightness is obtained under the experimental environment in advance based on the first display brightness and the display brightness of the display screen is adjusted from the first display brightness to the second display brightness, the ambient brightness information obtained by subtracting the value A from the ambient light detected under the second display brightness is inaccurate. According to the consistency between an increment of the display brightness of the display screen and an increment of the remaining brightness of the display screen, the more accurate ambient brightness information can be obtained by subtracting the increment of the display brightness from the obtained ambient brightness information.

It is to be noted that the decrease in the display brightness of the display screen from the first display brightness actually reduces the impact of the display brightness of the display screen on the ambient light detection, and thus it can be set that no correction is performed on the ambient brightness information.

As mentioned above, the brightness information detected by the terminal through the light sensor arranged below the display screen includes the ambient brightness information and the remaining brightness of the display screen. As a result, in the embodiments of the disclosure, the step S12 may include the following. The terminal detects the ambient light in the space gap between the display units of the display screen through the light sensor and obtains a first brightness value, calculates a light brightness difference between the first brightness value and a preset remaining brightness value of the display screen, and obtains the ambient brightness information according to the light brightness difference.

For example, when the calculated light brightness difference is 70 Lux, the ambient brightness information of the external environment is determined to be 70 Lux.

In another embodiment of the disclosure, as the display screen has a transmittance, the external ambient light will have a light loss when it is irradiated to the light sensor through the display screen. In order to enhance the accuracy in obtaining the ambient light brightness information of the external ambient, the operation that the terminal obtains the ambient brightness information according to the light brightness difference may include: the terminal obtains the ambient brightness information according to the light brightness difference and the transmittance of the display screen.

In the embodiments of the disclosure, after obtaining the ambient brightness information, the terminal may adjust the display brightness of the display screen according to the ambient brightness information.

For example, when the ambient brightness information is at a high level, the display brightness of the display screen may be increased; and when the ambient brightness information is at a low level, the display brightness of the display screen may be decreased to suit the users' eyes.

It can be understood that, in the embodiments of the disclosure, when the terminal needs to collect the ambient light during display of the frame images, the display frame rate of the display screen is switched from the first frame rate to the second frame rate that is less than the first frame rate, i.e., the time interval between the adjacent frame images is increased. As a result, when the ambient light is detected in the space gap between the display units of the display screen via the light sensor, on the one hand, the impact of the display brightness of the display screen on the ambient light detection can be reduced and the accuracy in obtaining the external ambient brightness information can be improved; and on the other hand, when image frames of different pictures are displayed on the display screen, the impact of the image frames of the different pictures on the display brightness of the display screen in the increased time interval may be reduced, so that when the frame images of different pictures are displayed, the consistency in the ambient light detection by the light sensor can be improved, thereby improving the consistency in obtaining the external ambient brightness information.

Figure 5:
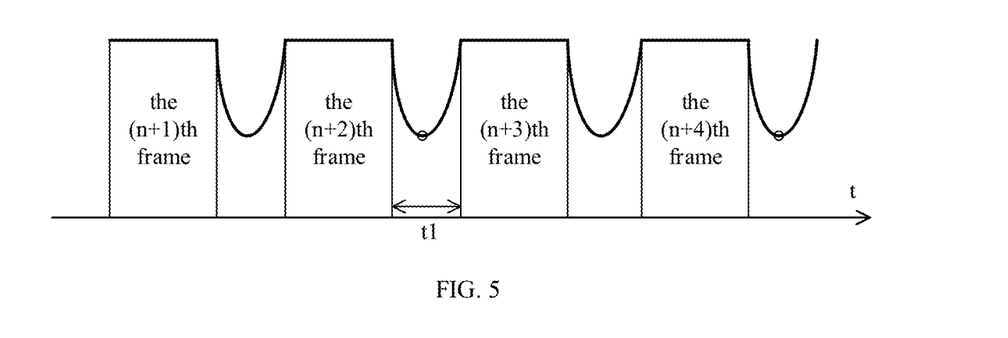
FIG. 5 is a diagram illustrating a method for detecting ambient light by a light sensor during display of image frames, according to an example of the present disclosure.

FIG. 5 is a diagram illustrating a method for detecting the ambient light during display of image frames. As illustrated in the FIG. 5, during the process of displaying the image frames, adjacent frame images are all displayed at a first frame rate which corresponds to a time interval t1 and the ambient light is detected via the light sensor within the time interval t1.

Figure 6:
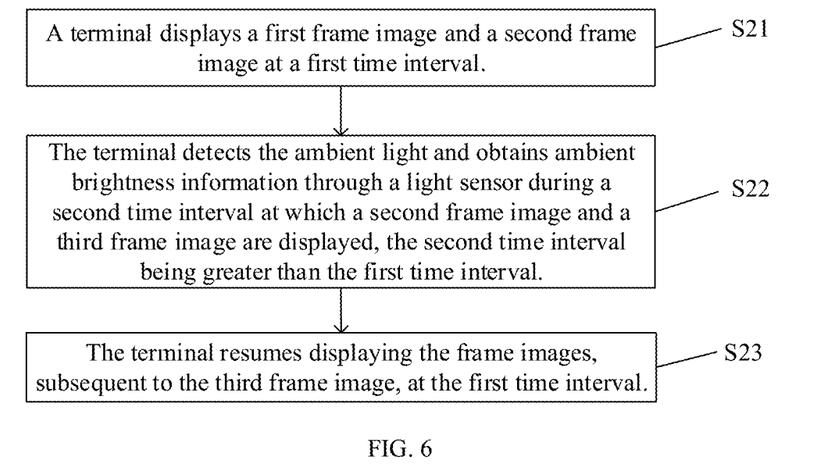
FIG. 6 is a diagram illustrating a method for detecting ambient light, according to an example of the present disclosure.

FIG. 6 is a diagram illustrating a method for detecting the ambient light according to an embodiment of the disclosure. As illustrated in the FIG. 6, the method for detecting the ambient light includes the following operations.

In S21, a terminal displays a first frame image and a second frame image at a first time interval.

In the embodiment of the disclosure, the two adjacent frame images displayed by the terminal at the first time interval are frame images displayed when the display frame rate of the terminal is a first frame rate.

In S22, the terminal detects the ambient light and obtains ambient brightness information through a light sensor during a second time interval at which a second frame image and a third frame image are displayed, the second time interval being greater than the first time interval.

In the embodiment of the disclosure, after displaying the second frame image, the terminal displays the third frame image at the second time interval greater than the first time interval, which corresponds to that the terminal switches the display frame rate from the first frame rate to the second frame rate after the second frame image is displayed.

The terminal detects the ambient light through the light sensor and obtains a first brightness value at the middle moment of the second and third frame images, which is the moment when the display brightness of the display screen is minimum. The first brightness value includes external ambient brightness information and a second brightness value of the display screen corresponding to the middle moment. Therefore, the terminal can obtain the ambient brightness information based on a difference between the first brightness value and the second brightness value that are obtained by the light sensor.

In S23, the terminal resumes displaying the frame images, subsequent to the third frame image, at the first time interval.

In the embodiment of the disclosure, after the external ambient light information is obtained, the terminal may resume display of the image frames at the first time interval, i.e., at the first frame rate, in order to guarantee a good display effect.

Figure 7:
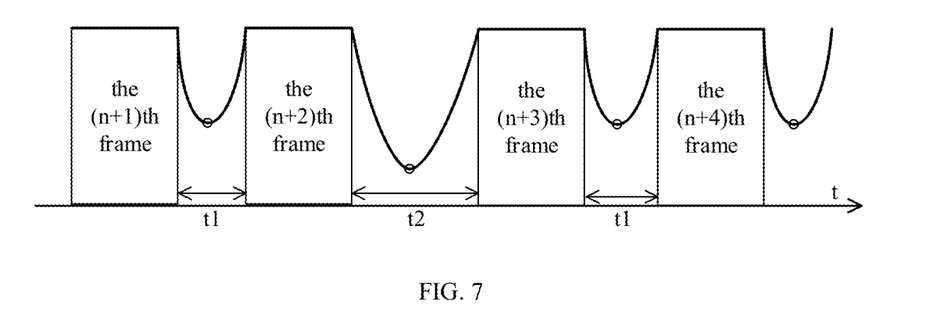
FIG. 7 is a diagram illustrating a method for detecting ambient light by a light sensor during display of image frames, according to an example of the present disclosure.

Based on the method in FIG. 6, FIG. 7 is a second diagram illustrating a method for detecting the ambient light by a light sensor during display of image frames according to an embodiment of the disclosure. As illustrated in the FIG. 7, during the display of the image frames, the (n+1)th frame image and the (n+2) frame image are displayed at the first frame rate, and in such a case, the time interval corresponding to the (n+1)th frame image and the (n+2)th frame image is t1. Then, after display of the (n+2)th frame image, the (n+3)th frame image is displayed at the second frame rate instead and the time interval corresponding to the (n+2)th frame image and the (n+3)th frame image is t2. After the (n+3)th frame image is displayed, the terminal displays the frame images at the first frame rate again.

It can be seen from FIG. 7 that t2 is greater than t1 and during the time interval of t1 and the time interval, the luminous brightness of the display screen is in a form of a parabola with an upwards opening, and the vertex value of the parabola during the display interval of t2 is less than that of the parabola during the display interval of t1 and the light sensor detects the ambient light within the time interval of t2.

It is to be understood that in the embodiment of the disclosure, the frame rate is decreased during display of the frame images to detect the ambient light and then reverts to the original value for display after the ambient light detection is completed, which enables, on the one hand, accuracy and consistency in obtaining the external ambient brightness information to be improved and on the other hand, a visual effect in displaying the image frames to be guaranteed.

Figure 8:
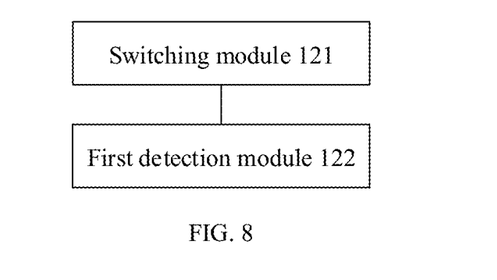
FIG. 8 is a diagram illustrating a device for detecting ambient light, according to an example of the present disclosure.

FIG. 8 is a diagram illustrating a device for detecting the ambient light according to an embodiment of the disclosure. The device may be applied to a terminal including a display screen and a light sensor arranged under the display screen. As illustrated in the FIG. 8, the device for detecting ambient light includes a switching module 121 and a first detection module 122.

The switching module 121 is configured to switch a display frame rate of the display screen from a first frame rate to a second frame rate when collection of the ambient light is required. The first frame rate is greater than the second frame rate.

The first detection module 122 is configured to detect the ambient light in a space gap between display units of the display screen through the light sensor and obtain ambient brightness information, during a time interval for display of the display screen at the second frame rate.

Figure 9:
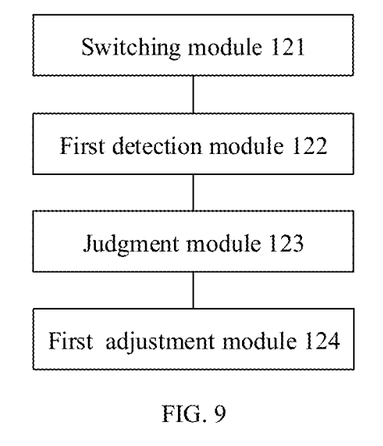
FIG. 9 is a diagram illustrating a device for detecting ambient light, according to an example of the present disclosure.

In some embodiments of the disclosure, as illustrated in FIG. 9, the device may further include a judgment module 123.

The judgment module 123 is configured to determine whether display brightness of the display screen is less than a preset brightness threshold.

The first detection module 122 is specifically configured to detect, when the display brightness of the display screen is less than the preset brightness threshold, the ambient light in the space gap between the display units of the display screen through the light sensor and obtain the ambient brightness information, within the time interval for display of the display screen at the second frame rate.

In some embodiments of the disclosure, when the display brightness of the display screen is greater than the preset brightness threshold within the time interval, the device may further include a first adjustment module 124, as illustrated in FIG. 9.

The first adjustment module 124 is configured to decrease the second frame rate.

Figure 10:
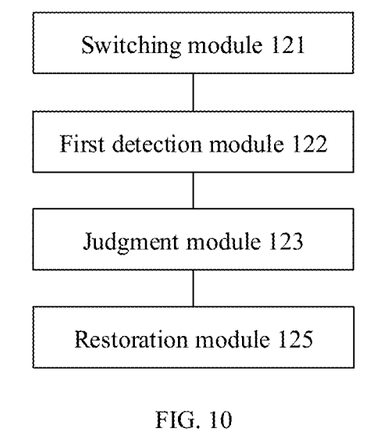
FIG. 10 is a diagram illustrating a device for detecting ambient light, according to an example of the present disclosure.

In some embodiments of the disclosure, as illustrated in FIG. 10, the device may further include a restoration module 125. The restoration module 125 is configured to restore the display frame rate of the display screen from the second frame rate to the first frame rate after the first detection module detects the ambient light in the space gap between the display units of the display screen.

Figure 11:
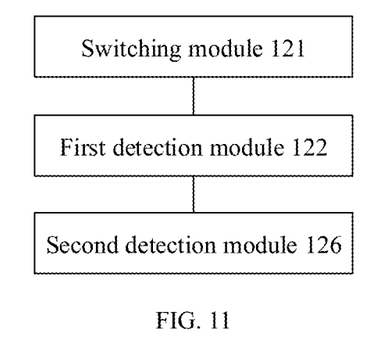
FIG. 11 is a diagram illustrating a device for detecting ambient light, according to an example of the present disclosure.

In some embodiments of the disclosure, as illustrated in FIG. 11, the device may further include a second detection module 126.

The second detection module 126 is configured to detect whether there are obstacles within a preset range.

The switching module 121 is specifically configured to switch, when there are no obstacles within the preset range, the display frame rate of the display screen from the first frame rate to the second frame rate.

Figure 12:
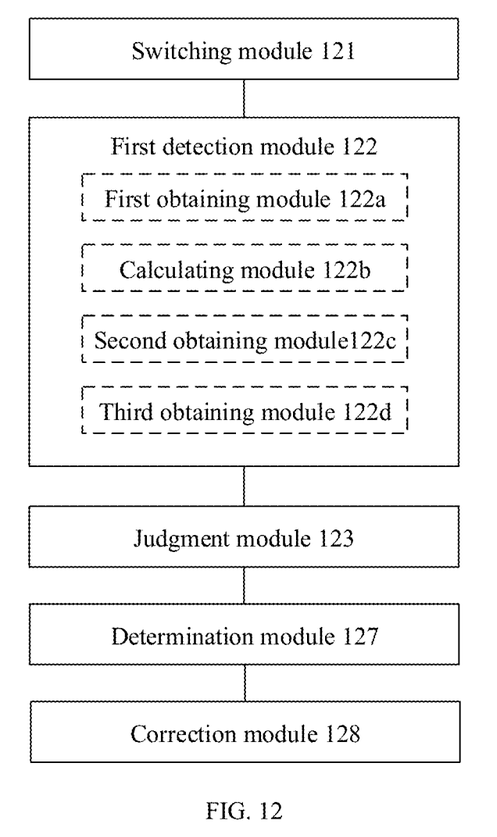
FIG. 12 is a diagram illustrating a device for detecting ambient light, according to an example of the present disclosure.

In some embodiments of the disclosure, as illustrated in FIG. 12, the device may further include a determination module 127 and a correction module 128. When the display brightness of the display screen is adjusted from the first display brightness to the second display brightness within a time interval during which the ambient light is detected, the determination module 127 is configured to determine a display brightness difference; and the correction module 128 is configured to correct the ambient brightness information based on the display brightness difference when the display brightness difference is greater than zero.

In some embodiments of the disclosure, as illustrated in FIG. 12, the first detection module 122 may include a first obtaining module 122a, a calculating module 122b and a second obtaining module 122c.

The first obtaining module 122a is configured to obtain a first brightness value by detecting the ambient light in the space gap between the display units of the display screen through the light sensor.

The calculating module 122b is configured to calculate a light brightness difference between the first brightness value and a preset remaining brightness value of the display screen.

The second obtaining module 122c is configured to obtain the ambient brightness information according to the light brightness difference.

In some embodiments of the disclosure, the first detection module 122 may include a third obtaining module 122d.

The third obtaining module 122d is configured to obtain the ambient brightness information according to the light brightness difference and a transmittance of the display screen.

Figure 13:
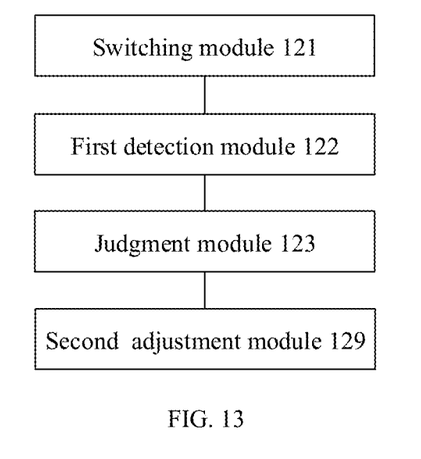
FIG. 13 is a diagram illustrating a device for detecting ambient light, according to an example of the present disclosure.

In some embodiments of the disclosure, as illustrated in FIG. 13, the device may further include a second adjustment module 129.

The second adjustment module 129 is configured to adjust the display brightness of the display screen according to the ambient brightness information.

With respect to the device in the above embodiments, the specific manners in which the modules perform operations have been described in detail in the method embodiments, which will not be elaborated herein.

The present disclosure also provides a device for detecting ambient light, which includes a processor and a memory configured to store an instruction executable for the processor. The processor is configured to implement operations of any method for detecting ambient light in the abovementioned embodiments. In an implementation, the processor may implement the functions of the switching module 121, the first detection module 122, the judgment module 123, the first adjustment module 124, the restoration module 125, the second detection module 126, the determination module 127, the correction module 128 and the second adjustment module 129.

Figure 14:
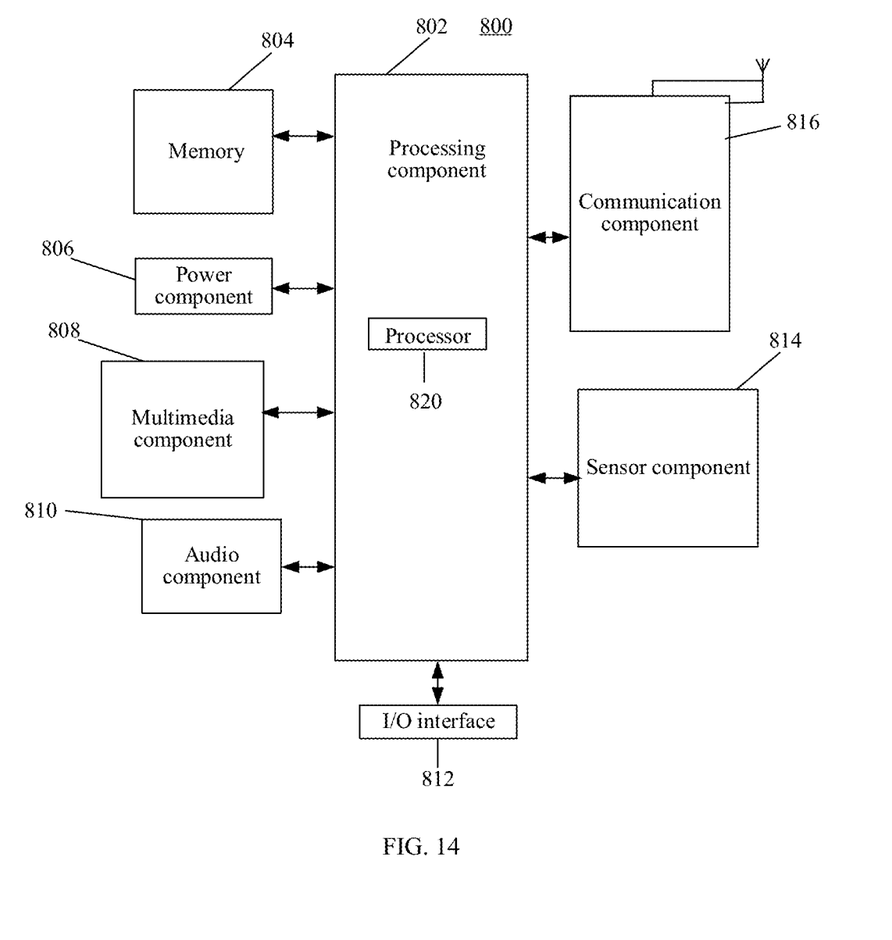
FIG. 14 is a block diagram illustrating a terminal, according to an example of the present disclosure.

FIG. 14 is a block diagram illustrating a mobile terminal device 800 according to an embodiment of the disclosure. For example, the device 800 may be a mobile phone, a mobile computer or the like.

Referring to FIG. 14, the device 800 may include one or more of the following components: a processing component 802, a memory 804, a power component 806, a multimedia component 808, an audio component 810, an Input/Output (I/O) interface 812, a sensor component 814 and a communication component 816.

The processing component 802 usually controls overall operations of the device 800 such as the operations associated with display, telephone calls, data communications, camera operations and recording operations. The processing component 802 may include one or more processors 820 to execute instructions to perform all or part of steps in the abovementioned methods. Moreover, the processing component 802 may further include one or more modules which facilitate interaction between the processing component 802 and the other components. For example, the processing component 802 may include a multimedia module to facilitate interaction between the multimedia component 808 and the processing component 802.

The memory 804 is configured to store various types of data to support operations of the device 800. Examples of such data include instructions for any APPs or methods operated on the device 800, contact data, phonebook data, messages, pictures, videos and so on. The memory 804 may be implemented by any type of volatile or non-volatile memory devices, or a combination thereof, such as a Static Random Access Memory (SRAM), an Electrically Erasable Programmable Read-Only Memory (EEPROM), an Eras-able Programmable Read-Only Memory (EPROM), a Programmable Read-Only Memory (PROM), a Read-Only Memory (ROM), a magnetic memory, a flash memory, a magnetic disk or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments of the disclosure, the screen may include a liquid crystal display (LCD) or organic light-emitting diode (OLED), and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments of the disclosure, the multimedia component 808 includes a front camera and/or a rear camera. The front camera and/or the rear camera may receive external multimedia data when the device 800 is in an operation mode, such as a photographing mode or a video mode. Each of the front camera and/or the rear camera may be a fixed optical lens system or have focusing and optical zooming capabilities.

The audio component 810 may be configured to output and/or input an audio signal. For example, the audio component 810 includes a microphone (MIC) and the MIC is configured to receive an external audio signal when the device 800 is in the operation mode such as a call mode, a recording mode and a voice recognition mode. The received signal may further be stored in the memory 804 or sent through the communication component 816. In some embodiments of the disclosure, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a P-sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging APP. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and other equipment. The device 800 may access a communication-standard-based wireless network, such as a Wireless Fidelity (Wi-Fi) network, a 2nd-Generation (2G) or 3rd-Generation (3G) network or a combination thereof. In an embodiment, the communication component 816 receives a broadcast signal or broadcast associated information from an external broadcast management system through a broadcast channel. In an embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology or another technology.

In an embodiment of the disclosure, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an embodiment of the disclosure, there is also provided a non-transitory computer readable storage medium including an instruction, such as the memory 804 including an instruction, and the instruction may be executed by the processor 820 of the device 800 to implement the abovementioned methods. For example, the non-transitory computer readable storage medium may be a ROM, Random Access Memory (RAM), a Compact Disc Read-Only Memory (CD-ROM), a magnetic tape, a floppy disc, an optical data storage device and the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

The present disclosure also provides a non-transitory computer-readable storage medium. An instruction in the storage medium may be executed by a processor of a terminal to enable the terminal to execute a controlling method. The terminal includes a display screen and a light sensor arranged below the display screen. The method may include the following operations.

When collection of the ambient light is required, a display frame rate of the display screen is switched from a first frame rate to a second frame rate and the first frame rate is greater than the second frame rate.

The ambient light is detected in a space gap between display units of the display screen through the light sensor and ambient brightness information is obtained, during a time interval for display of the display screen at the second frame rate.

Other implementations of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as an example only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for detecting ambient light, comprising:
    switching, by a terminal comprising a display screen and light sensor arranged under the display screen, when detection of ambient light is requested, a display frame rate of the display screen from a first frame rate to a second frame rate, the first frame rate being greater than the second frame rate, wherein the display frame rate indicates a number of frames displayed by the display screen per unit of time;
    detecting, by the light sensor, during a time interval where the second frame rate is applied, the ambient light that passes through a space gap between display units of the display screen to the light sensor;
    determining, by the terminal, whether a display brightness of the display screen is less than a preset brightness threshold; and
    obtaining, by the terminal, ambient brightness information based on the ambient light detected, wherein obtaining the ambient brightness information comprises:
        obtaining the ambient brightness information based on the ambient light detected when the display brightness of the display screen is less than the preset brightness threshold.

2. The method according to claim 1, wherein when the display brightness of the display screen within the time interval is greater than the preset brightness threshold, the method further comprises:
    decreasing, by the terminal, the second frame rate.

3. The method according to claim 1, further comprising:
    restoring, by the terminal, after obtaining the ambient brightness information, the display frame rate of the display screen from the second frame rate to the first frame rate.

4. The method according to claim 1, further comprising:
    detecting, by the terminal, whether there are obstacles within a preset range; and
    switching, by the terminal, when there are no obstacles within the preset range, the display frame rate of the display screen from the first frame rate to the second frame rate.

5. The method according to claim 1, further comprising:
    determining, by the terminal, when a display brightness of the display screen is adjusted from a first display brightness to a second display brightness within a time interval during which the ambient light is detected, a display brightness difference between the first display brightness and the second display brightness; and
    correcting, by the terminal, the ambient brightness information based on the display brightness difference when the display brightness difference is greater than zero.

6. The method according to claim 1, wherein detecting, during the time interval where the second frame rate is applied, the ambient light that passes through a space gap between display units of the display screen to the light sensor, further comprises:

detecting the ambient light in the space gap between the display units of the display screen through the light sensor to obtain a first brightness value;

calculating a light brightness difference between the first brightness value and a preset remaining brightness value of the display screen; and wherein obtaining ambient brightness information based on the ambient light detected further comprises:

obtaining the ambient brightness information based on the ambient light detected according to the light brightness difference.

7. The method according to claim 6, wherein obtaining the ambient brightness information based on the ambient light detected according to light brightness difference further comprises:

obtaining the ambient brightness information based on the ambient light detected according to the light brightness difference and a transmittance of the display screen.

8. The method according to claim 6, further comprising: adjusting a display brightness of the display screen according to the ambient brightness information.

9. A device for detecting ambient light on a terminal comprising:

a display screen;

a light sensor, wherein the light sensor is arranged under the display screen within the terminal;

one or more processors; and a non-transitory computer-readable storage medium configured to store an instruction executable for the one or more processors;

wherein the display screen has multiple display units;

wherein the one or more processors are configured to:

switch when detection of ambient light is requested, a display frame rate of a display screen from a first frame rate to a second frame rate, the first frame rate being greater than the second frame rate, wherein the display frame rate indicates a number of frames displayed by the display screen per unit of time;

detect, during a time interval where the second frame rate is applied, the ambient light that passes through a space gap between display units of the display screen to the light sensor;

determine whether a display brightness of the display screen is less than a preset brightness threshold; and obtain ambient brightness information based on the ambient light detected when the display brightness of the display screen is less than the preset brightness threshold.

10. The device according to claim 9, wherein when the display brightness of the display screen is greater than the preset brightness threshold within the time interval, the processor is configured to:

decrease the second frame rate.

11. The device according to claim 9, wherein the one or more processors are further configured to:

restore the display frame rate of the display screen from the second frame rate to the first frame rate after obtaining the ambient brightness information.

12. The device according to claim 9, wherein the one or more processors are configured to:

detect whether there are obstacles within a preset range; and switch, when there are no obstacles within the preset range, the display frame rate of the display screen from the first frame rate to the second frame rate.

13. The device according to claim 9, wherein the one or more processors are configured to:

determine, when the display brightness of the display screen is adjusted from a first display brightness to a second display brightness within a time interval during which the ambient light is detected, a display brightness difference between the first display brightness and the second display brightness; and correct, when the display brightness difference is greater than zero, the ambient brightness information based on the display brightness difference.

14. The device according to claim 9, wherein the one or more processors are, when detecting the ambient light that passes through a space gap between display units of the display screen to the light sensor, further configured to:

detect the ambient light in the space gap between the display units of the display screen through the light sensor to obtain a first brightness value;

calculate a light brightness difference between the first brightness value and a preset remaining brightness value of the display screen; and wherein the one or more processors are, when obtaining ambient brightness information based on the ambient light detected, further configured to:

obtain the ambient brightness information based on the ambient light detected according to the light brightness difference.

15. The device according to claim 14, wherein the one or more processors, when obtaining the ambient brightness information based on the ambient light detected according to light brightness difference, are further configured to:

obtain the ambient brightness information based on the ambient light detected according to the light brightness difference and a transmittance of the display screen.

16. The device according to claim 14, wherein the one or more processors are further configured to:

adjust a display brightness of the display screen according to the ambient brightness information.

17. A non-transitory computer-readable storage medium, storing computer program instructions that, when executed by one or more processors, cause the one or more processors to perform acts comprising:

switching, when detection of ambient light is requested, a display frame rate of a display screen from a first frame rate to a second frame rate, the first frame rate being greater than the second frame rate, wherein a terminal comprises the display screen and a light sensor arranged under the display screen, wherein the display frame rate indicates a number of frames displayed by the display screen per unit of time;

detecting, during a time interval when the second frame rate is applied, the ambient light that passes through a space gap between display units of the display screen to the light sensor;

determine whether a display brightness of the display screen is less than a preset brightness threshold; and obtaining ambient brightness information based on the ambient light detected when the display brightness of the display screen is less than the preset brightness threshold.

18. The method according to claim 1, wherein the obtaining, by the terminal, ambient brightness information based on the ambient light detected, comprises;

calculating the ambient brightness information as a difference between a brightness value detected by the light sensor and a remaining brightness value of the display screen corresponding to a current frame rate of the display screen.

* * * * *